INVENTOR.
Paul H. Hamisch, Sr.
BY Wood, Herron & Evans
ATTORNEYS

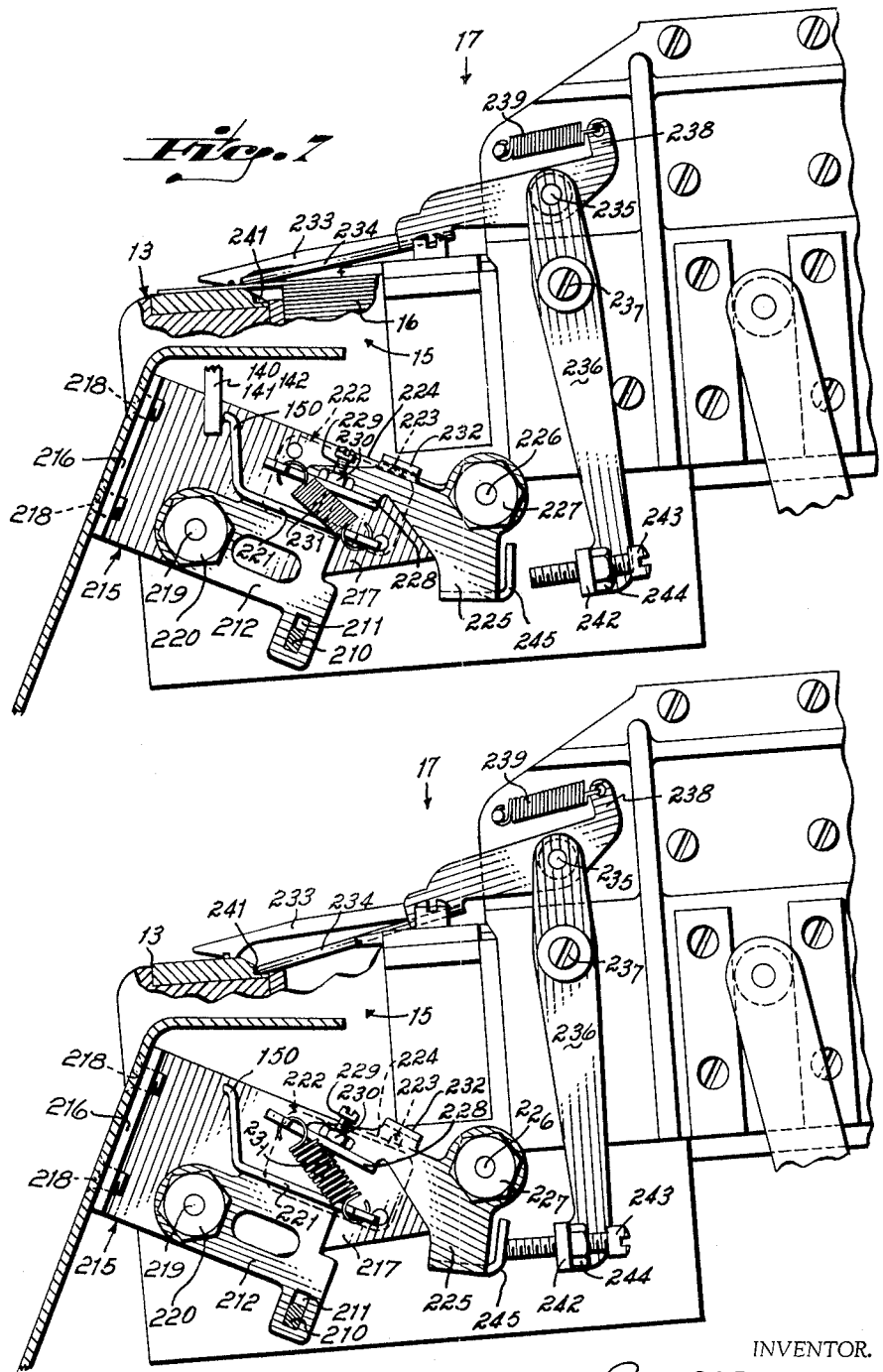

INVENTOR.
Paul H. Hamisch, Sr.
BY
Wood, Herron + Evans
ATTORNEYS

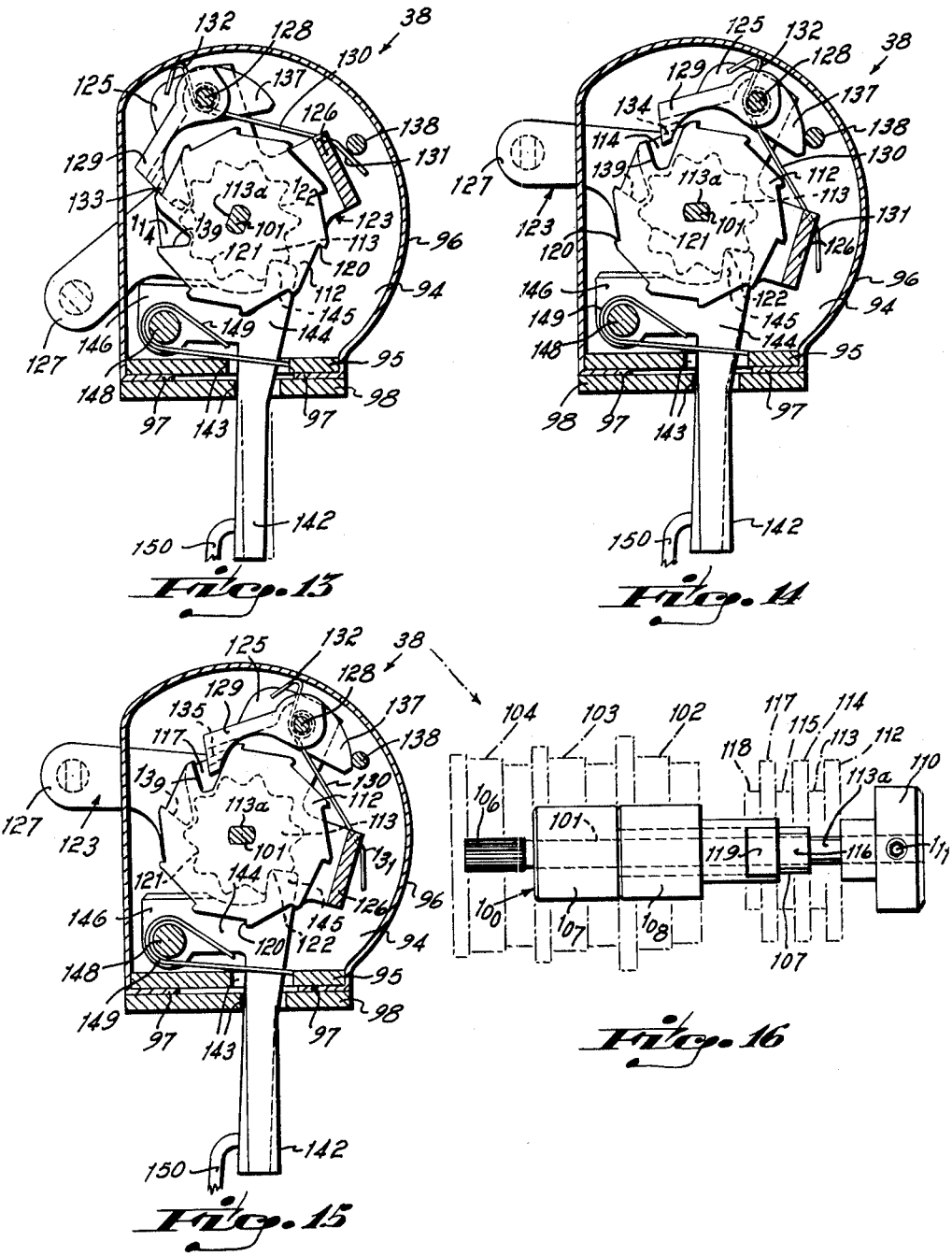

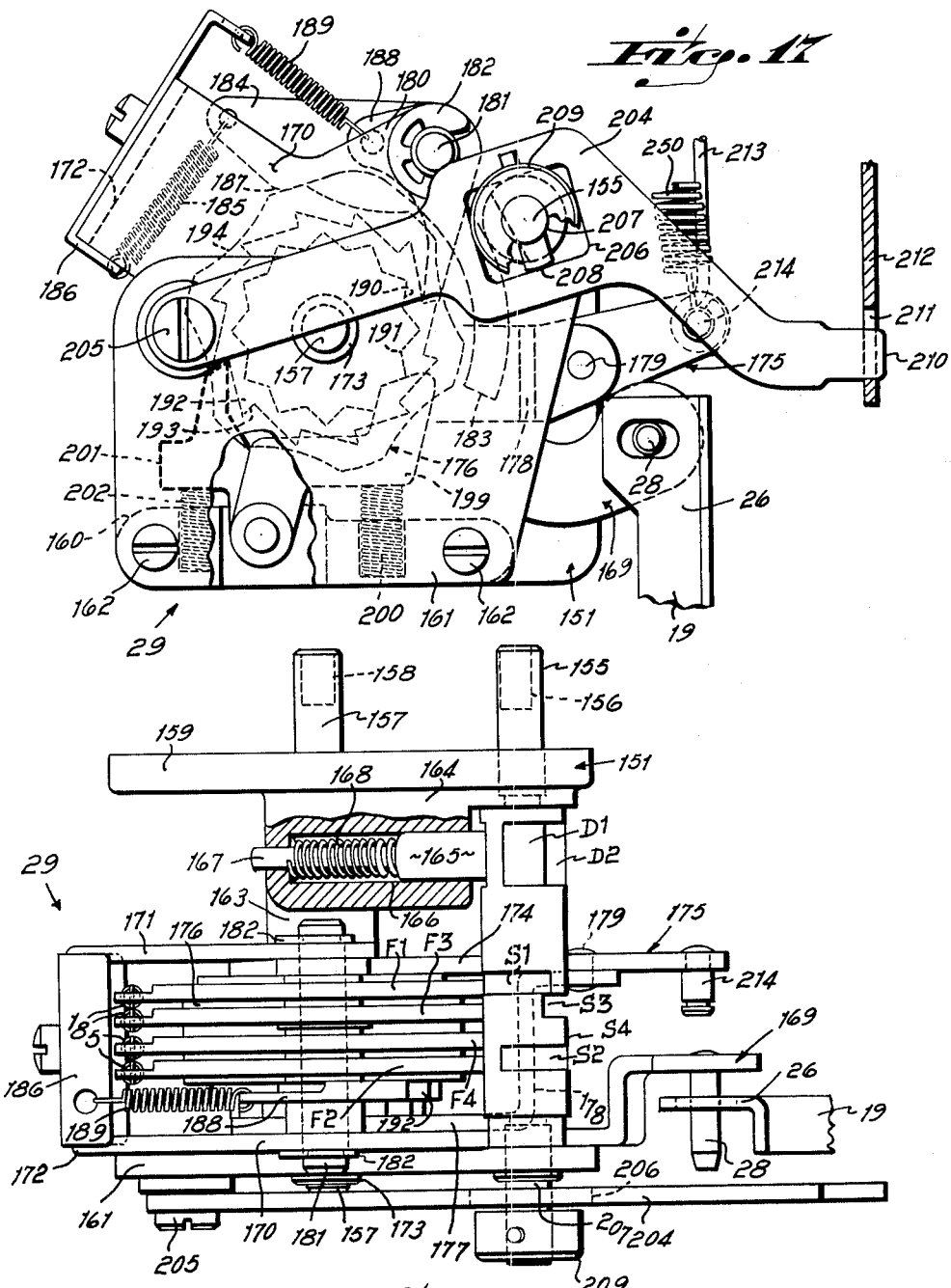

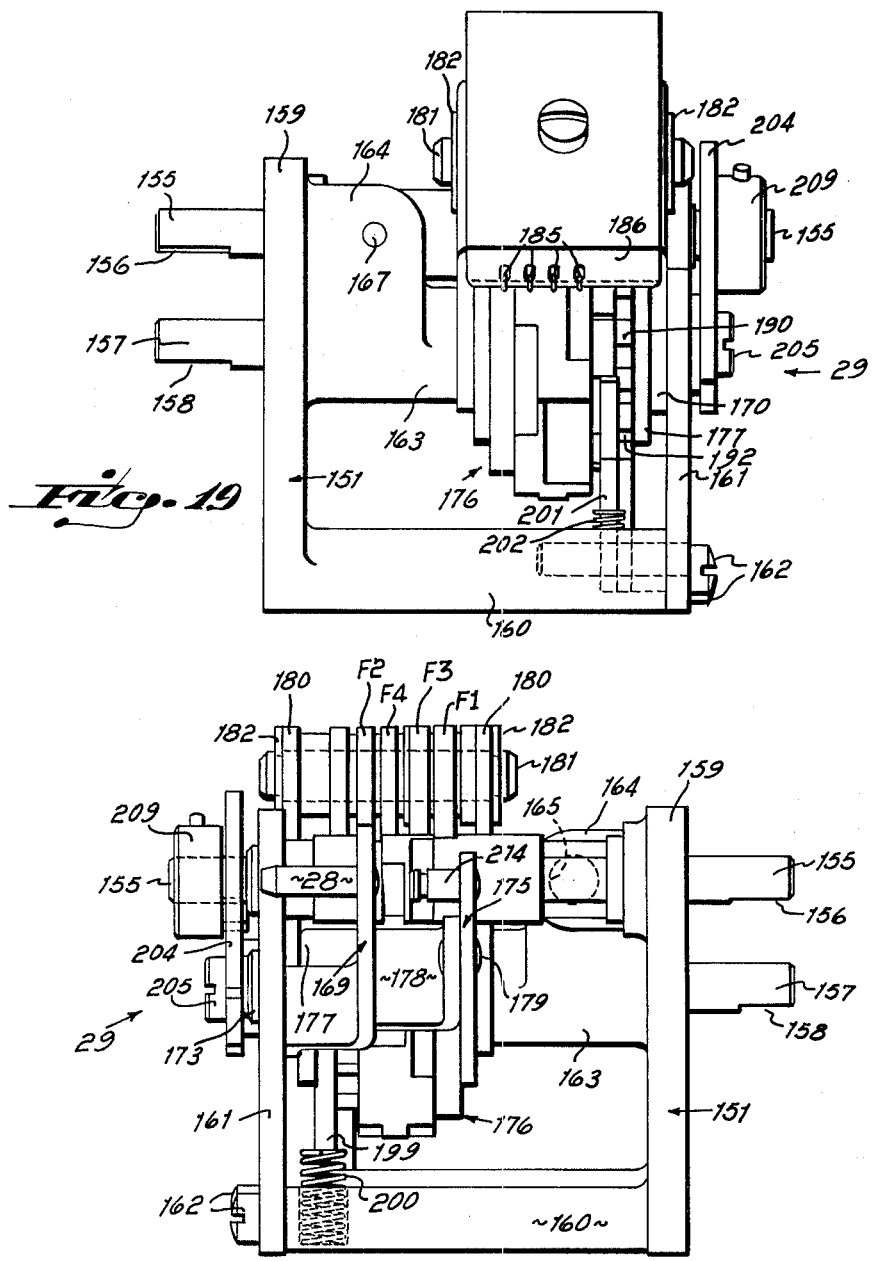

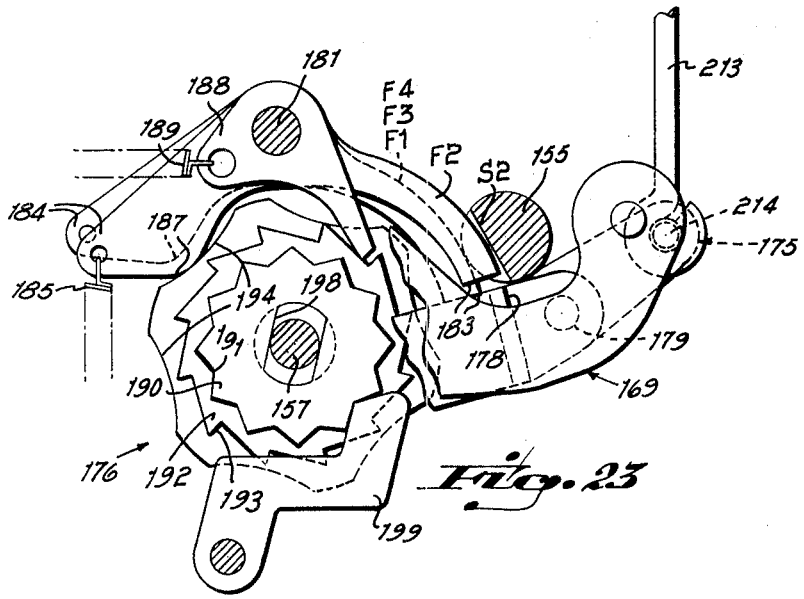

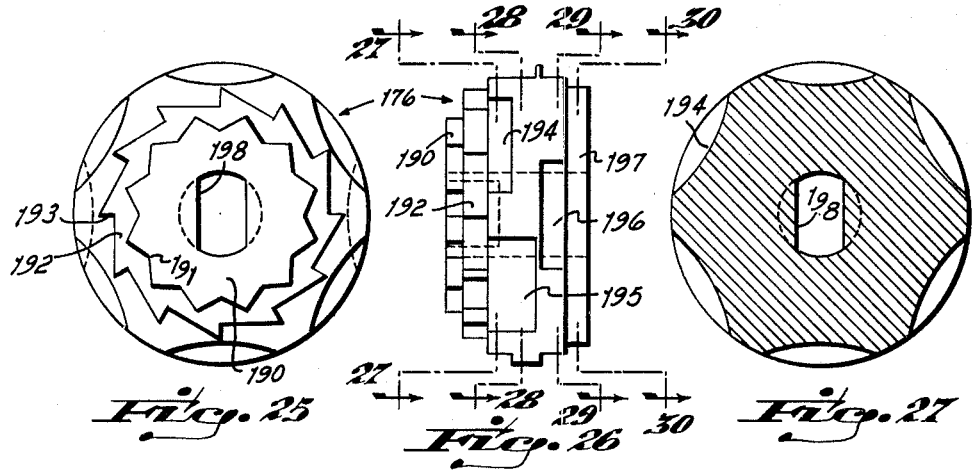
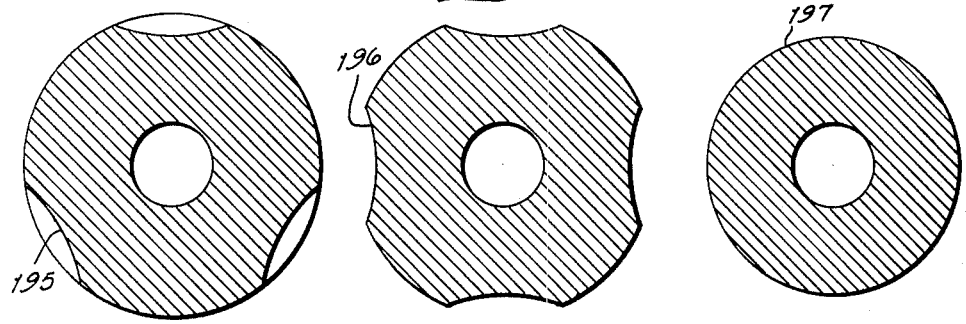
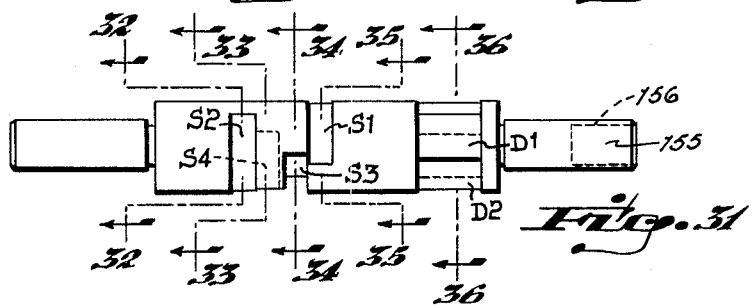
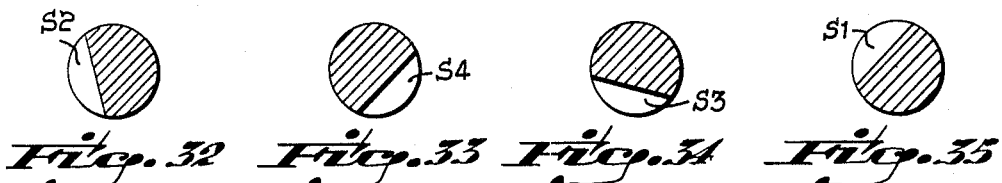
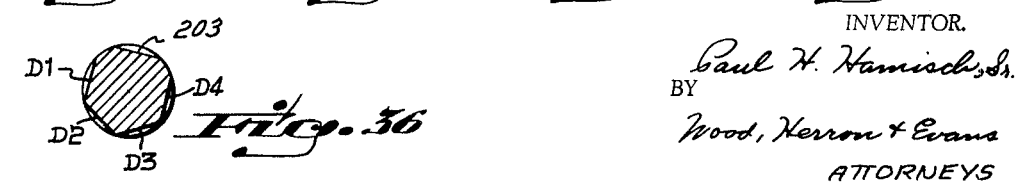

INVENTOR.
Paul H. Hamisch, Sr.
BY
Wood, Herron + Evans
ATTORNEYS

United States Patent Office 3,228,601
Patented Jan. 11, 1966

3,228,601
CONTROLS FOR MARKING MACHINE
Paul H. Hamisch, Sr., Dayton, Ohio, assignor to The Monarch Marking System Company, Dayton, Ohio, a corporation of Ohio
Filed Feb. 20, 1964, Ser. No. 346,240
1 Claim. (Cl. 235—132)

This invention relates to price marking machines that are utilized to print prices and other information upon tags, tickets, and labels. The machine of this invention is capable of handling, i.e., feeding, printing, and dispensing a variety of different types of tags, tickets and labels, including those provided in continuous strip form and those provided as individual entities. However, inasmuch as the demands placed upon the machine are greatest in the handling of those individual tags utilized in the ready-to-wear garment trade, the invention is disclosed primarily in relation to those features of the machine which are especially adapted for use in the handling of ready-to-wear tags.

An identifying characteristic of these tags is that they are made up of one, two, three or more parts with each part being adapted to carry a considerable amount of information in addition to price, and in the case of multi-part tags, each part repeating the information. The multi-part ready-to-wear tags comprise parts which are defined one from the other by serrated lines along which the parts are adapted to be torn one from the other at the time of a sale. One part of the tag is designed to remain with the garment as it goes into the hands of the purchaser to be used as identification in the event of a return of the garment. The second part may be used for inventory control purposes. A third part may be used for billing purposes. A fourth part may be used for record purposes in the department. Of course, the demands for different numbers of parts of individual tags may vary from department to department and from store to store.

Therefore, it has been one objective of this invention to provide a marking machine which is readily adaptable, with a minimum amount of adjustment and handling, to receive and operate upon multi-part tags of various widths.

It is inherent in the marking of ready-to-wear tags that the runs of tags carrying identical information be relatively short. To take a specific example, a dress of a popular style may be stocked in ten different sizes, several different colors, and there may be a price differential between the smallest and largest sizes. Assuming that only two of the smallest size are stocked, increasing numbers stocked through the intermediate sizes, and only one of the largest size stocked, it may be seen that a great number of short runs of tags must be printed with different size, color, and price indicia in order to properly identify and price all of the dresses in this one style.

It therefore has been another objective of this invention to provide a marking machine in which changes in tags for different runs can be accomplished rapidly with a minimum of effort.

The machine of this invention is also the subject of a copending patent application Serial No. 296,664, filed July 22, 1963. The copending application is concerned primarily with those parts of the machine that contact or handle the tags, that is, the tag feeding mechanism, the inking mechanism, the printing mechanism and a hopper mechanism for receiving and holding tags to be printed.

This invention is directed to the controls of the machine and particularly start and stop controls that operate automatically to insure the printing of predetermined numbers of multi-part tags. This is essentially a counting operation. Counters have been employed for many years in the marking machine field and it has been customary to set a counter to count off specified numbers of cycles of the machine. Under these circumstances, a counter lever may be connected directly to a part of the machine that reciprocates once during each cycle. As an example, see Patent 2,622,804. Thus, the counter indicates the number of printing cycles of the machine. If this type of counter were employed in a machine adapted to print multi-part tags, it would count off parts of tags rather than complete tags. This would entail the operator setting the counter for four times the number of tags desired in a particular run when four part tags are being printed, three times the number when three part tags are being printed, two times the number when two part tags are being printed and, of course, the counter could be set to the exact number desired in a run when one part tags are being printed. However, in running multi-part tags that vary in the number of parts from one run to next, there is considerable room for error by the operator, and with this in mind, it has been another objective of the invention to provide a counting mechanism that counts complete tags rather than parts of multi-part tags.

Toward this end, a count selector a provided that may be set according to the number of parts in the tags being run in any one printing operation. This count selector is operated by means of a drive link that is connected to a reciprocating part of the machine and it is, of course, operated once during each cycle of the machine, and this corresponds to the printing of one part of a multi-part tag. The count selector in turn is linked to a counter. However, the count selector becomes effective to operate the counter only once every fourth cycle when set for four part tags, only once every third cycle when set for three part tags, only once every second cycle when set for two part tags, but every cycle when set for one part tags. Additionally, reset means are provided for "clearing" the counter selector when it is desired to change from a run of tags having one number of parts to a run of tags having a different number of parts. In operation, the counter counts off the printing of complete multi-part tags, down to a zero setting, at which time a micro-switch is operated by the counter to decommission the machine.

In certain types of marking operations, it is desirable to precount the number of tags to be printed in a run before they are placed in the machine. An operation of this sort is often desirable wherein tags are color coded. For runs of this type, the counter is not required and provision is made to make it and the count selector ineffective, to free the micro-switch from counter control, and to place the micro-switch under the control of means associated with the feed finger mechanism of the machine such that the machine is decommissioned automatically when the last tag of the precounted run has been printed. Thus, in both types of automatic operation, the one switch is utilized which greatly simplifies wiring and other mechanisms related to the starting and stopping of the machine.

Other objectives and advantages of the invention will be readily apparent to those skilled in the art from the following detailed description of the drawings in which:

FIGURE 7 is a fragmentary side elevational view showing the automatic shut off finger riding across a tag in the hopper.

FIGURE 8 is a view similar to FIGURE 7 illustrating the automatic shut off finger in its operative position for decommissioning the machine under circumstances when no tags are within the hopper.

FIGURE 13 is a view similar to FIGURES 11 and 12 showing the units pawl of the counter driving the units ratchet.

FIGURE 14 is a view similar to FIGURE 13 showing the tens pawl engaging the tens ratchet.

FIGURE 15 is a view similar to FIGURE 14 showing the hundreds pawl engaging the hundreds ratchet.

FIGURE 16 is an elevational view of the shaft assembly of the counter with the major parts associated with the shaft assembly shown in dot dash lines.

FIGURE 17 is a rear elevational view of the count selector set in its "lock-out" or "off" position. In this view, some parts are broken away and others shown fragmentarily only for purposes of illustration.

FIGURE 18 is a view looking down on the count selector with parts broken away for illustration purposes.

FIGURE 19 is an elevational view of the count selector as viewed from the right.

FIGURE 20 is an elevational view of the count selector as viewed from the left.

FIGURE 23 is a view similar to FIGURES 21 and 22 showing the parts of a count selector in positions to transmit a count to the counter.

FIGURE 24 is a view similar to FIGURE 23 showing the parts in more advanced positions of movement to transmit a count to the counter.

FIGURE 25 is an elevational view of the drum of the count selector.

FIGURE 26 is a side elevational view of the drum.

FIGURES 27 through 30 are cross sectional views taken on the lines 27—27 to 30—30 on FIGURE 26.

FIGURE 31 is an elevational view showing the top of the shaft of the count selector as set for four-part tag operation.

FIGURES 32 through 36 are cross sectional views taken on the lines 32—32 through 36—36 on FIGURE 31.

Figure 37:
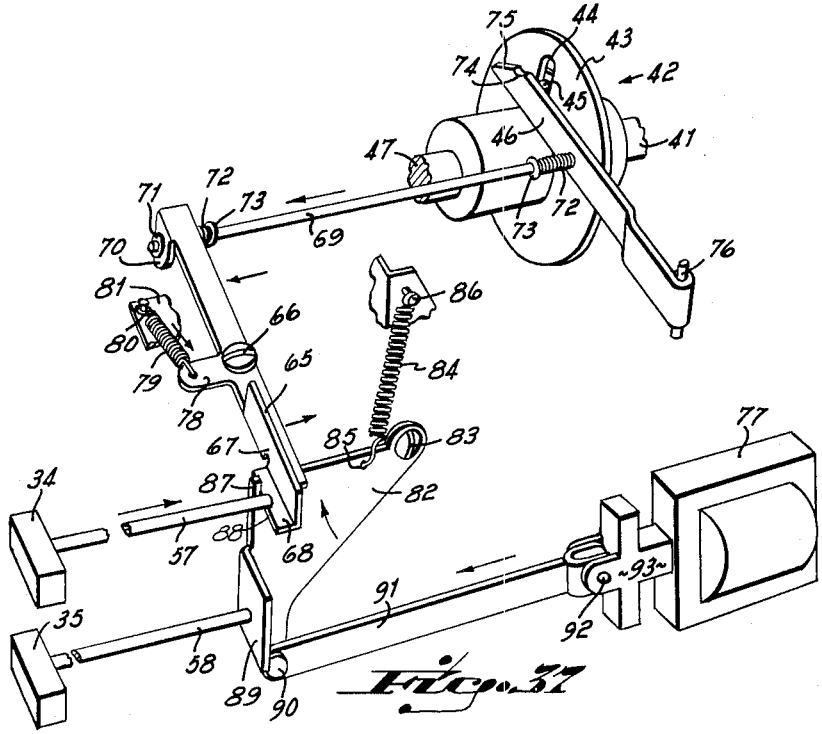

FIGURE 37 is a diagrammatic, fragmentary, perspective view illustrating the way in which the clutch is commissioned for starting a tag printing operation.

Figure 38:
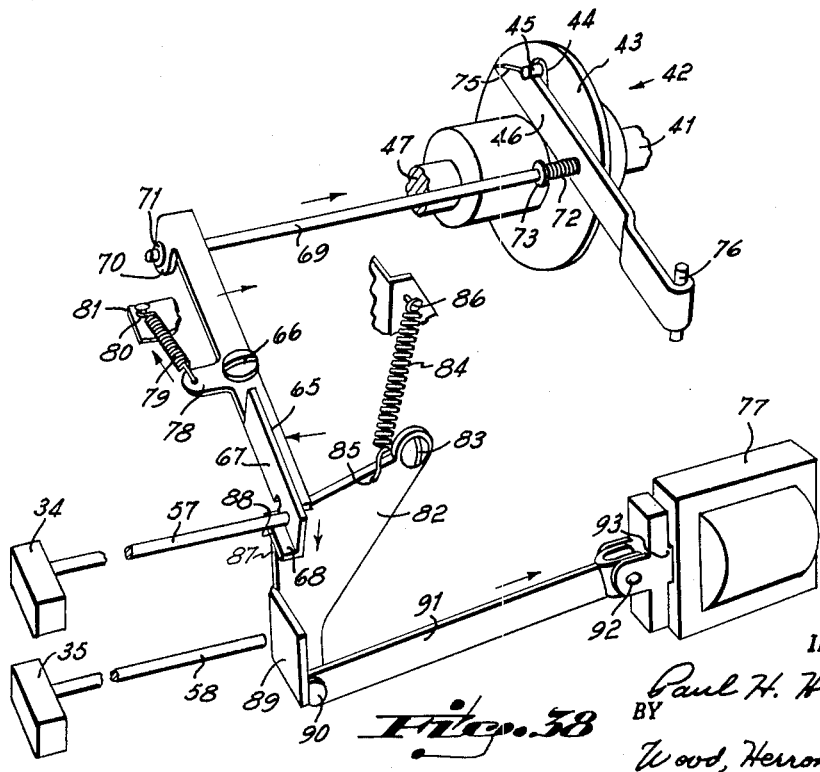

FIGURE 38 is a view similar to FIGURE 37 showing the way in which the clutch is decommissioned at the end of a tag printing operation by the solenoid in the lower left hand part of this figure.

FIGURE 39 is a fragmentary side elevational view showing the drive link that joins the hopper platen assembly of the machine to the count selector for driving the selector.

Figure 1:
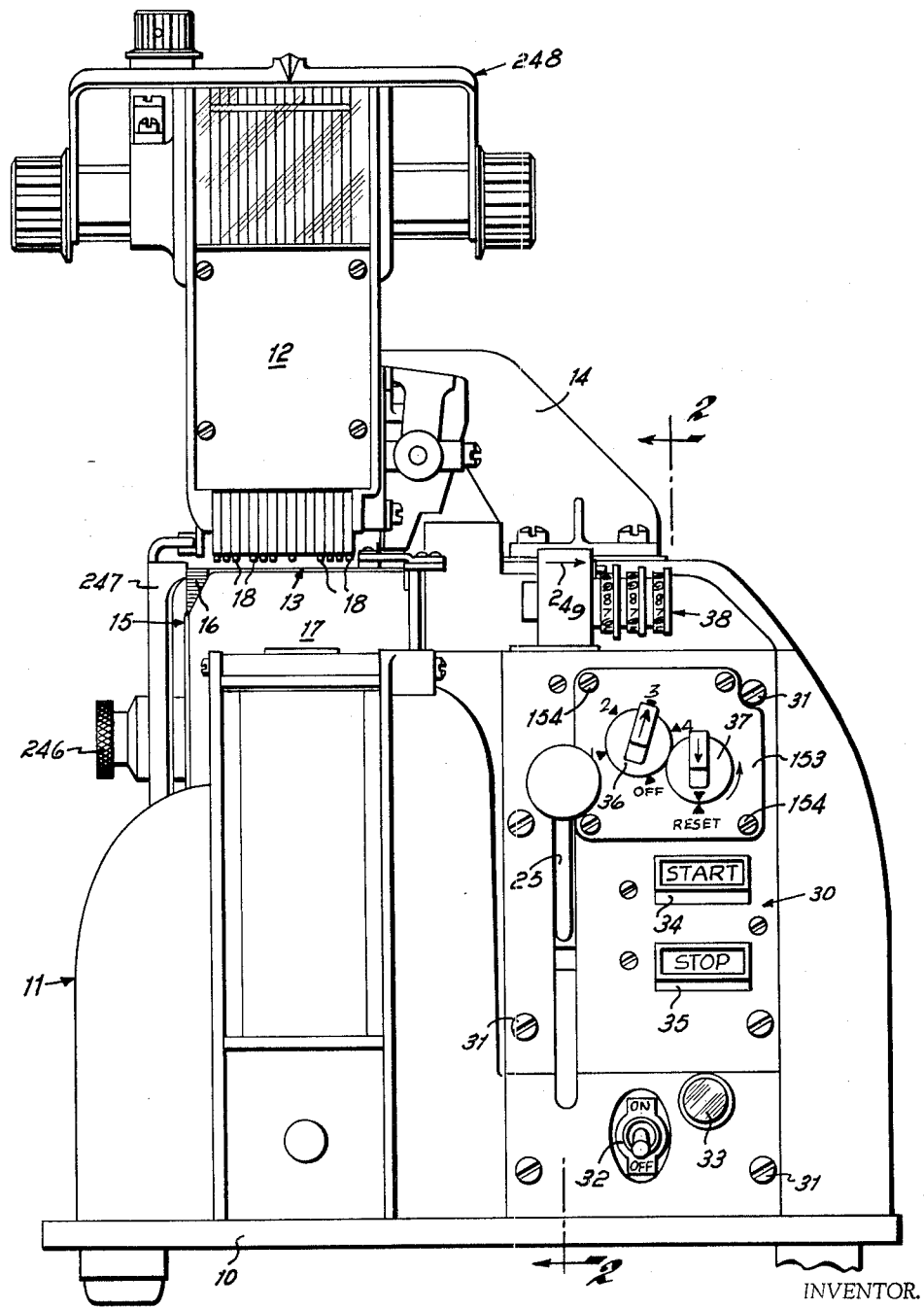
FIGURE 1 is a front elevational view of a marking machine incorporating this invention.

Referring to FIGURE 1, the machine is mounted upon a base 10 and enclosed within a housing designated generally by the numeral 11. This housing is made in parts constituting panels for access to the interior of the machine. A printing head assembly designated 12 is mounted above a printing platen 13 in cantilever fashion by means of a bracket 14. For a general description of the frame members and particularly those parts of the machine that contact, handle or feed tags, tickets, and labels through the machine reference is made to copending application Serial No. 296,664, filed July 22, 1963. Since this application is concerned primarily with the controls and mechanism for counting numbers of tags, tickets and labels, the following description of the drawings will be limited primarily to the controls rather than repeating the description of those parts of the machine toward which the copending application is directed.

Generally tags, tickets and labels are fed through the machine, as viewed in FIGURE 1, from back to front and they are discharged at the front of the machine moving off of the printing platen 13. A hopper shown generally at 15 holds the ready-to-wear garment tags 16. The hopper 15 is part of a hopper platen assembly, designated generally 17, that is mounted upon a horizontal shaft, not shown, at the rear of the machine for rocking movement in which the platen 13 moves up and down toward and away from printing characters 18 at the bottom of printing head 12. This rocking movement of the hopper platen assembly is utilized to swing a drive link 19 up and down. (See FIGURES 2 and 39.) This drive link is pivotally mounted at the rear as at 20 on a bracket 21 that is secured to a cast frame member 22 mounted upon base 10. Drive link 19 extends forwardly from bracket 21 and includes a fork connector 23 by which it is attached to the hopper platen assembly, being held thereagainst by a large headed bolt 24 that passes through the fork connector. For convenience, this attachment is made adjacent to the inner end of a handle 25 that, as explained in the copending application, is used for depressing a table within the hopper upon which the tags are placed. The forward part of the drive link 19 extends upwardly on an arc centered at pivot 20 and this arcuate portion is right angular in cross section as shown in FIGURE 39 to provide a flange 26 having an opening 27 at the top thereof through which a pin 28 projects, this pin being a part of a count selector mechanism designated generally by the numeral 29 which count selector is to be described in detail under a section of this specification entitled, "Count Selector." It may be seen therefore that the up and down movement of the hopper platen assembly 17 is translated to the count selector by means of the drive link 19.

Most of the parts of the machine toward which this invention is directed are mounted either upon, or are closely associated with, a removable control panel 30 that is at the front of the machine. This panel is fastened to frame members of the machine by bolts 31. Control panel 30, in the lower part thereof, mounts a main on-off switch 32 for the machine and an indicator light 33 that comes on whenever switch 32 is on. The control panel also mounts a start button 34 and a stop button 35, these two buttons being rectangular in outline as shown. The upper part of the control panel 30 mounts two knobs 36 and 37 that are part of the count selector 29. Knob 36 has five positions corresponding to 1 through 4 part tag operation plus an "Off" position. Knob 37 is adapted to be rotated through 360° and stopped at the "reset" position whenever knob 36 is changed in position, this rotating movement conditioning the count selector mechanism for the new setting of knob 36. A counter shown generally at 38 is mounted on top of the control panel and this counter is to be described in detail under the heading "Counter." Generally, however, the counter is of the type adapted to count backwards from a maximum reading of 999 to 0. This counter is somewhat similar to the one shown in Patent 2,622,804. However, as will be apparent, the counter of this invention has additional improvements and features not shown in Patent 2,622,804.

Figure 2:
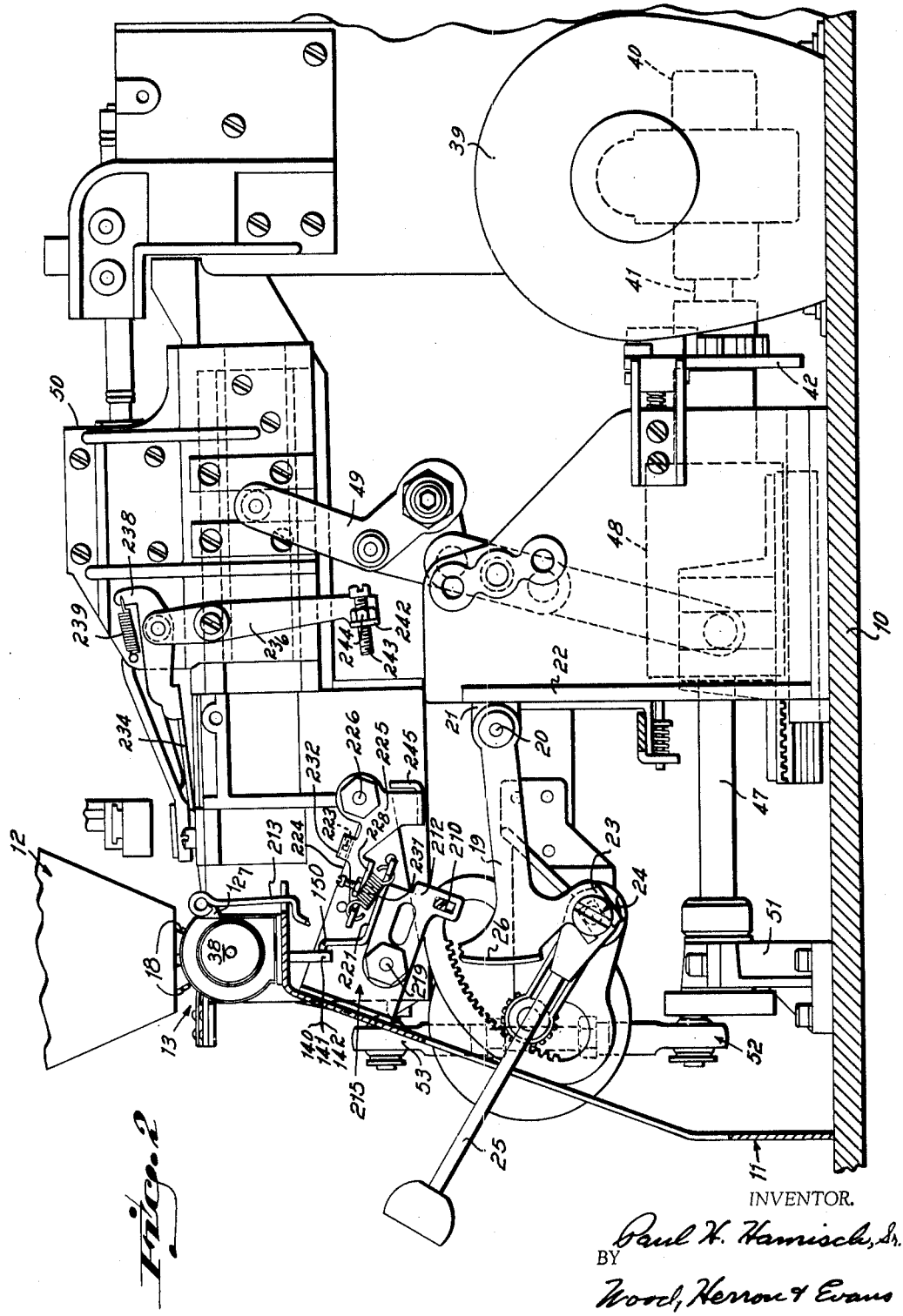
FIGURE 2 is a fragmentary cross sectional view taken on the line 2—2 of FIGURE 1.

Reference is made to FIGURE 2. By way of background, and as disclosed in copending application Serial No. 296,664, the machine is driven by an electric motor 39 that is located at the rear of the machine with its shaft extending crosswise of the base of the machine. This motor includes a speed reducer 40 at the left end thereof. A shaft 41 projecting forwardly from the speed reducer 40 is engaged with a rear part of a clutch assembly 42. This clutch assembly is of a standard type that has been in use for a great number of years, being disclosed in expired Patent No. 1,889,250. As shown in FIGURES 37 and 38, the clutch assembly includes a disc 43 having a radial slot 44 therein through which a pin 45 projects from the rear of a clutch. This pin carries a pawl, not shown, and when the pin is toward the inner end of slot 44, the pawl is engaged in teeth which commission the clutch. When the pin 45 is raised to the position shown in FIGURE 38, the pawl is lifted and the clutch is decommissioned. The pin 45 cooperates with a clutch arm 46, as will be explained, to engage and disengage the clutch in the same position of rotation each time. A shaft 47 projects from the front of the clutch and this shaft carries a cylindrical cam 48 having a continuous groove in it by means of which a rocker arm assembly 49 is driven to reciprocate a feed finger carriage assembly 50 toward and away from the forward end of the hopper platen assembly 17. Additionally, the forward portion of shaft 47 is journalled in a bearing 51 and a crank, designated generally 52, on the forward end of shaft 47 is connected by means of a crank arm 53 to the forward end of the hopper platen assembly. Thus, this one main drive shaft 47, under the control of clutch 42, serves to drive both the hopper platen assembly in its up and down rocking movement and the feed finger carriage 50 in its back and forth movement on top of the hopper platen assembly.

*Stop-start button control*

Figure 3:
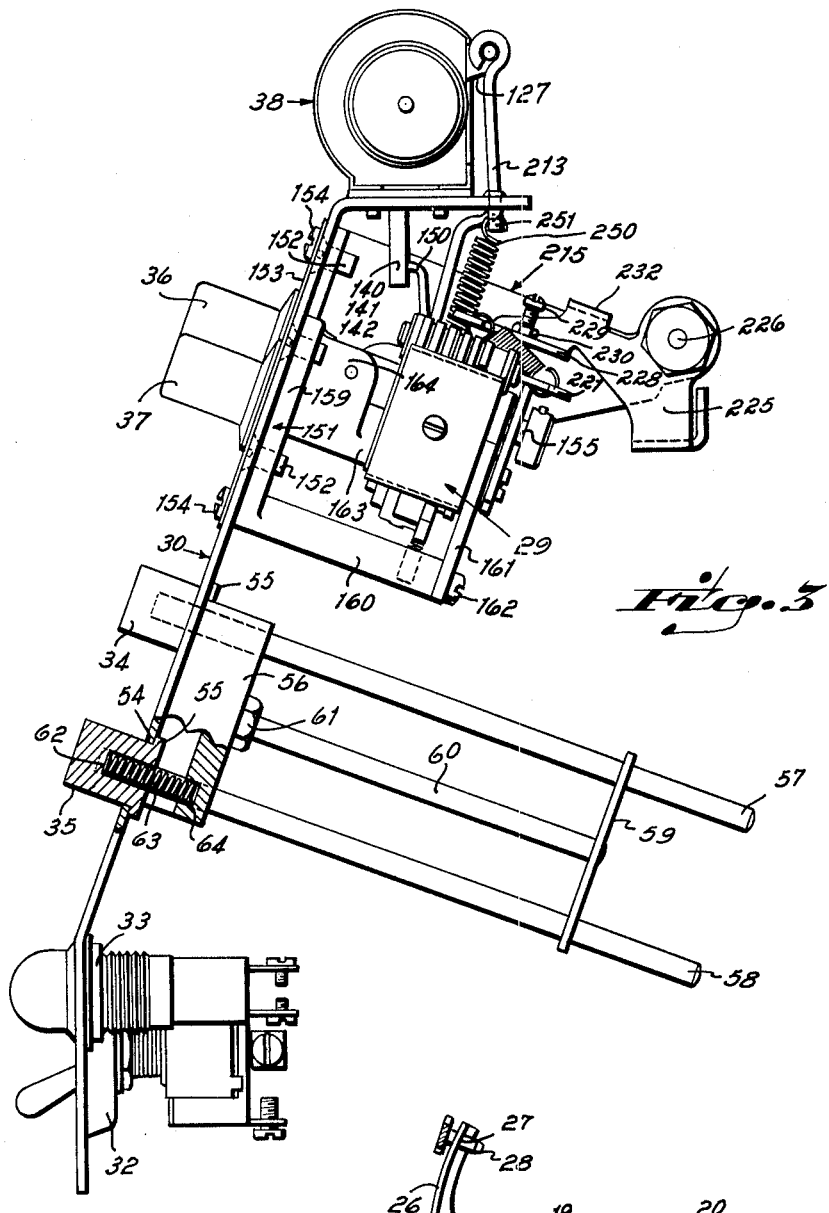
FIGURE 3 is a fragmentary cross sectional view showing those parts including control knobs and buttons, that are associated with a removable control plate at the front of the machine.
Figure 4:
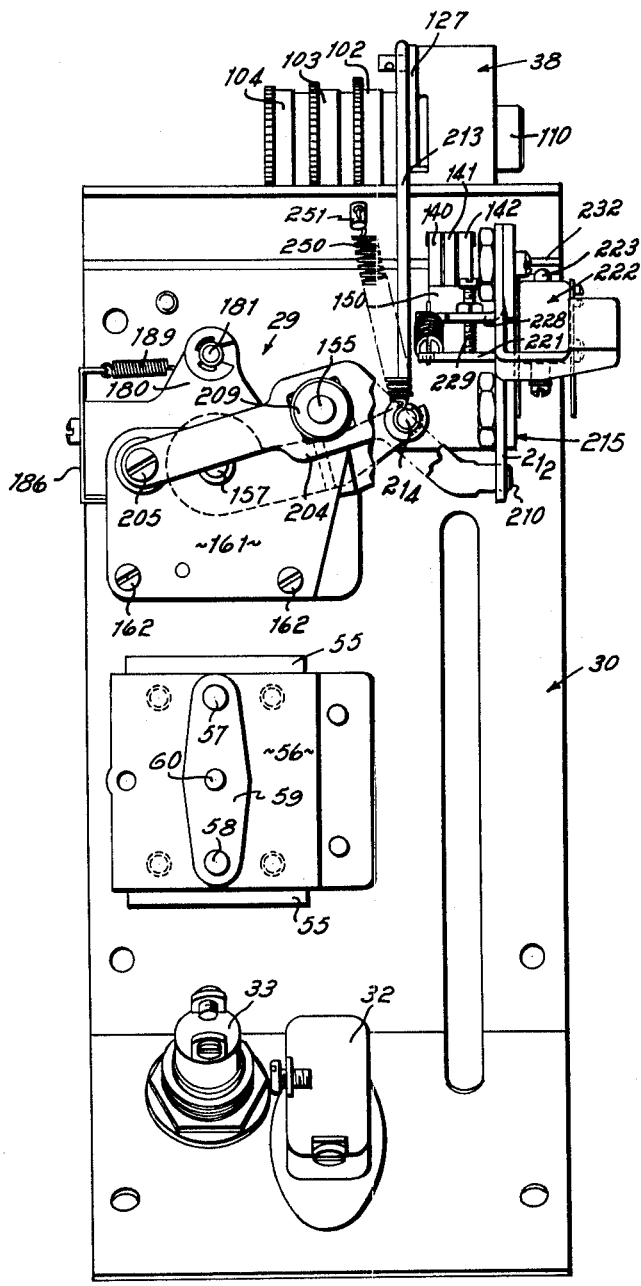
FIGURE 4 is a rear elevational view of the removable control plate.
Figure 5:
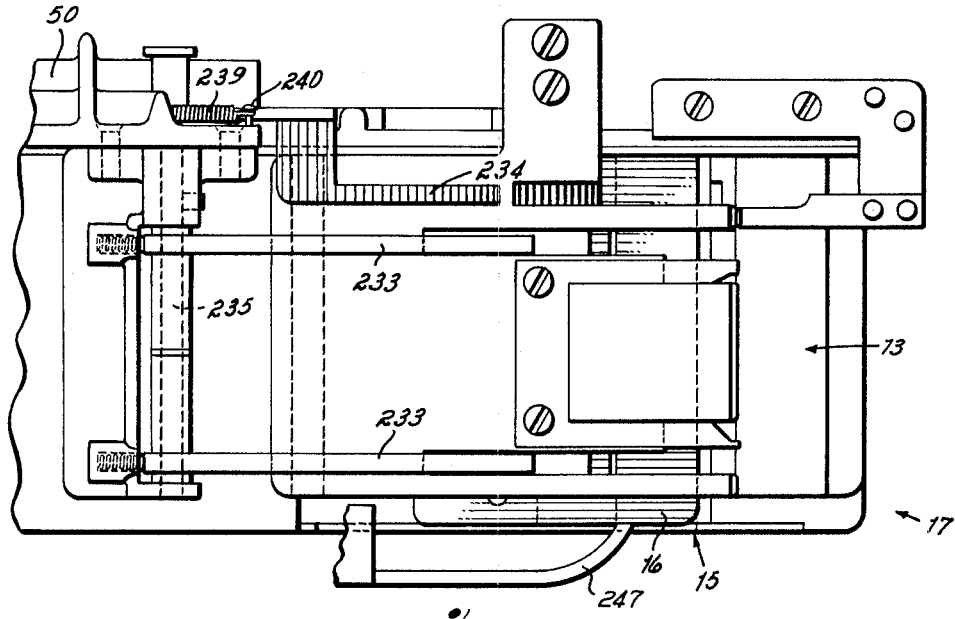
FIGURE 5 is a fragmentary elevational view looking down on the table of the machine over which tags are fed to a printing platen at the right. This view shows a tag within a hopper beneath the table and it also shows an automatic shut off finger that is associated with the feed finger carriage of the machine.
Figure 6:
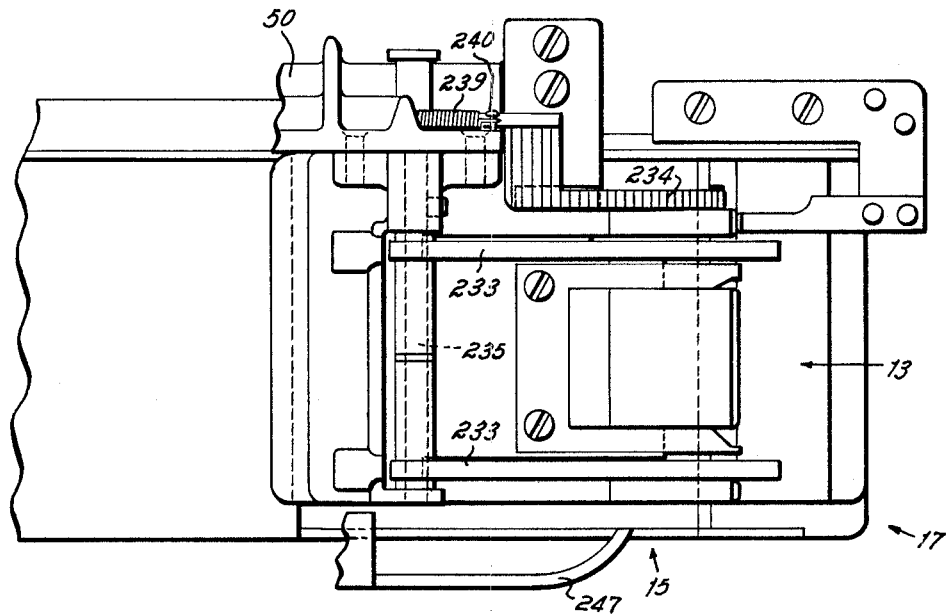
FIGURE 6 is a view similar to FIGURE 5 illustrating the feed fingers in their forwardmost positions atop the printing platen at the right and showing the automatic shut off finger in the operative position that it assumes when there is no tag in the hopper.
Figure 9:
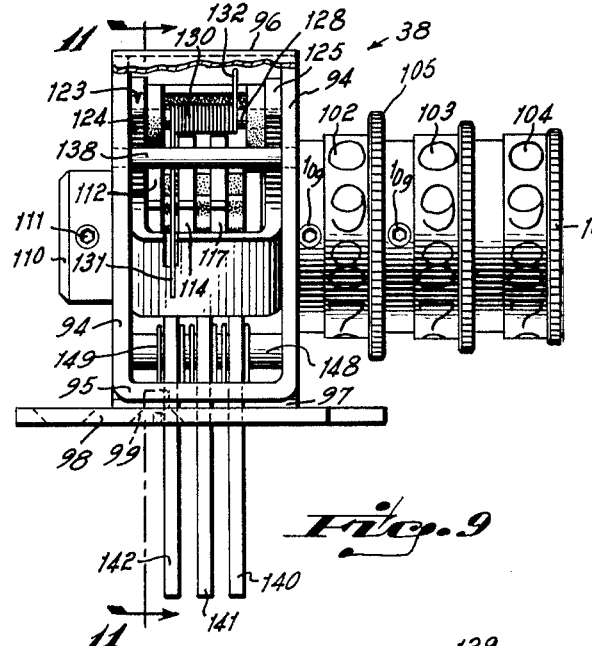
FIGURE 9 is a fragmentary elevational view, with parts broken away for illustration purposes, showing the counter of the machine.

The start button 34 is depressed each time the machine is started for a run in which the machine is to be automatically stopped after a predetermined number of tags have been printed. The machine may also be stopped manually at any time by depressing the stop button. As shown in FIGURES 3 and 4, each button is rectangular in outline projecting from the front of the control panel 30 through rectangular openings similar to the one shown at 54 in FIGURE 3. The rear of each button has a flange 55 thereon that engages the rear of the control panel immediately surrounding opening 55. The buttons are confined at the rear of the control panel within a block 56 that is fastened to the control panel by means of three bolts passing into the block from the front of the control panel. Start button 34 is molded onto the forward end of a reach rod 57 and stop button 35 is molded onto the forward end of a reach rod 58. These two reach rods extend rearwardly, slanting downwardly into the machine. Their inner ends pass through appropriate holes in a spreader 59 which guides them. The spreader is secured to the rear of block 56 by means of a rod 60 that is between the two reach rods 57 and 58 paralleling them. The rod 60 may be locked to the rear of block 56 by means such as a nut 61. Each button has two bores in its rear face at the two sides of the reach rod. One of these bores is shown at 62 in FIGURE 3. Both bores receive coil springs 63—63. The inner ends of these coil springs are socketed as at 64 within block 56 so that the springs cause the buttons to project from the front of control panel 30 except at such times as they are manually depressed.

Reference is now made to the diagrammatic views of FIGURES 37 and 38 which illustrate the way in which the two buttons operate. When the start button is depressed the reach rod 57 engages a latch arm 65. The latch arm is pivoted as at 66 adjacent to its center for swinging movement in a horizontal plane. The right end of the latch arm 65 engageable by reach rod 57 has a vertical flange 67 thereon and a horizontal flange 68 thereon. These flanges may be formed as an integral part of the latch arm as shown. When the start button is depressed reach rod 57 is moved inwardly and its inner end engages the vertical flange 67. This causes the latch arm to swing as shown by the arrows in FIGURE 37 so that the left end of the arm swings toward the front of the machine. The left end of the arm is connected to a clutch actuating rod 69. This is done by turning a flange 70 downwardly from the left end of the arm, which flange has a hole in it through which the forward end of the clutch actuating rod 69 passes being held therein by a snap ring 71. A coil spring 72 surrounds the actuating rod 69 adjacent to its forward end such that one end of the spring abuts flange 70 and the other end of the spring abuts a snap ring 73 that is on the clutch actuator rod 69. The same type of connection, identified by the same numerals, is made between clutch actuator rod 69 and the clutch arm 46 so that there can be lost motion between the latch arm 65 and the clutch arm 46 when the left end of the arm moves toward the rear. However, there is no lost motion when the left end of the latch arm 65 is swung forwardly.

With the clutch in the condition shown in FIGURE 38, the clutch pin 45 rests in an arcuate depression 74 atop the clutch arm 46 adjacent to its outer end. Between the depression 74 and the outer end of the arm, the arm angulates downwardly to provide a cam surface 75. When the start button is depressed the clutch arm 46 is swung about a pivot pin 76 that is at its right end, away from clutch 42. This swinging motion pulls the outer end of the arm 46 at the clutch forwardly to disengage clutch pin 45 from the depression 74. This permits clutch pin 45 to drop under the action of a spring (not shown) and the clutch is engaged.

Depressing the start button also preconditions the latch arm 65 for subsequent tripping, which tripping, as will be explained, results in the clutch actuator rod being moved to the rear. When this occurs, the cam surface 75 is brought into the path of revolution of the latch pin 45 and the pin rides up the cam surface being lifted thereby disengaging the clutch and coming to rest in the depression 74.

Rearward movement of the clutch actuator rod to decommission the clutch may be accomplished by depressing the stop button 35 or it may be accomplished by actuating a solenoid 77. The first type of operation is manual whereas the latter operation is automatic.

In addition to actuating the clutch to start the machine and preconditioning latch arm 65 for subseqeunt tripping, depressing the start button also conditions a solenoid 77 for automatic clutch disengagement. This will now be explained. The latch arm 65 has a lever 78 projecting forwardly from the side thereof at the pivot 66. One end of a coil spring 79 is hooked to the lever 78. The opposite end 80 of the coil spring is anchored to a bracket 81 affixed to a frame member of the machine. Under the action of the coil spring 79, the tendency is for the latch arm 65 to swing such that the right end thereof having vertical flange 67 thereon moves forwardly. The inner end of the reach rod 57 provides a limit for the swinging movement. At the same time, the left end of the latch arm 65 carrying flange 70 moves toward the rear. At this time, the clutch disc 43 is revolving and if the clutch pin 45 is in back of the clutch arm 46 the coil springs 72 on the clutch actuator rod compress. However, as soon as the clutch pin 45 clears the clutch arm 46, the cam surface 75 on the clutch arm is in a position to intercept the clutch pin 45. Therefore, it may be seen that the actuator rod 69 is moved toward the rear to disengage the clutch by the coil spring 79.

However, coil spring 79 cannot become effective until a latch plate 82 is dropped either by depressing stop button 35 or the actuation of solenoid 77. The latch plate 82 is pivotally mounted as at 83 so that its motion is one in which its forward end rocks up and down within limits. Normally, a coil spring 84, having its lower end hooked as at 85 in the latch plate and having its upper end fastened as at 86 to a frame member, holds the latch plate 82 in a position in which its forward end is elevated. The upper forward end of latch plate 82 has a projection 87 thereon that is adapted to engage the front of a ledge 88 that is on the latch arm 65. The lower portion of the forward edge of latch plate 82 is turned over at right angles to provide an abutment flange 89 adapted to be engaged by the inner end of the stop button reach rod 58. Thus, when the stop button is depressed, the reach rod 58 engages flange 89 which swings the forward end of latch plate 82 downwardly to disengage the projection 87 on latch plate 82 from ledge 88. This frees latch arm 65 so that it can swing under the action of coil spring 79 to push the clutch actuator rod 69 toward the rear to bring clutch arm 46 into a position to intercept the clutch pin 45. This constitutes a manual decommissioning of the clutch.

The lower forward end of latch plate 82 is pivotally connected by means such as a rivet 90 to a link 91. The rear end of link 91 is pinned as at 92 to the armature 93 of solenoid 77. It may be seen therefore that when solenoid 77 is energized, the link 91 is pulled rearwardly which results in a downward swinging movement of the forward end of latch plate 82. This frees the latch arm 65 so that it can be swung under the action of coil spring 79 to decommission the clutch. This occurs during automatic operation of the machine, and the movements of the various parts involved are illustrated by arrows in FIGURE 38.

When the start button is next depressed, the right end of the latch arm 65 is swung toward the rear which permits the coil spring 84 to swing the forward end of latch plate 82 up so that projection 87 can again engage ledge 88 thus holding latch arm 65 against the force of coil spring 79. Under these conditions, the latch is ready to be tripped either by the stop button or the solenoid, the actuation of either one of which drops the latch plate 82 so that coil spring 79 may become effective to decommission the clutch.

*Counter*

Figure 10:
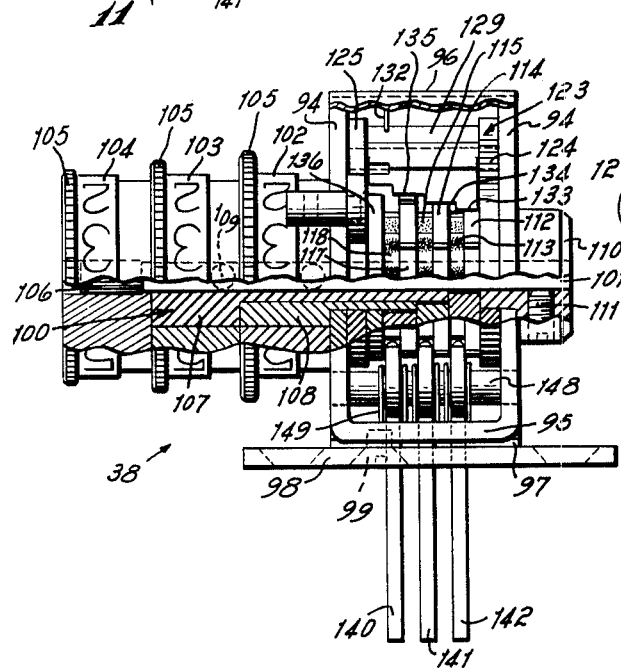
FIGURE 10 is a fragmentary cross sectional view illustrating the counter as viewed from the rear.

Reference is now made to FIGURES 9 through 16. The counter comprises a U-shaped frame that includes side walls 94—94 and a bottom wall 95. The frame is enclosed within a wrap-around cover plate 96, the opposite ends 97—97 of which are turned inwardly toward one another beneath bottom wall 95 of the frame. These ends of the cover plate are fastened along with a base plate 98 by flat headed bolts such as the one shown in dotted lines at 99, the bolts threading up through the base plate into bottom wall 95. Side walls 94—94 have appropriate bores wherein to receive and journal a shaft assembly 100 for the counter. This shaft assembly includes a core shaft 101 that mounts, at one side of the frame, three indicator wheels representing respectively the hundreds indicator wheel shown at 102, the tens indicator wheel shown at 103, and the digits indicator wheel shown at 104. Each of these wheels has a narrow, knurled rim 105 by which it can be rotated manually, and preferably, as shown, the rims increase in diameter from the digits wheel to the hundreds wheel so that they can be distinguished by the operator by feel. As shown in FIGURE 10, the digits wheel 104 is secured directly to the outer end of the core shaft 101 by splines 106. Conventionally, the tens wheel is secured to a stepped collar 107 that immediately surrounds core 101 and the hundreds wheel is also mounted on a stepped collar 108 that surrounds a portion of the stepped collar 107. The tens and hundreds wheels are locked to the stepped collars 107 and 108 respectively by set screws 109—109. A stepped collar 110 at the opposite side of the frame is locked to the projecting end of core shaft 101 by a set screw 111.

As shown at the right in FIGURE 10, the core shaft 101 that has the digits indicator wheel 104 keyed to it mounts a ratchet wheel 112 to which is affixed a detent wheel 113. These two elements may be integral with one another and they are keyed to the core shaft at a flat 113a. A similar set of wheels including a ratchet wheel 114 and a detent wheel 115 are keyed by a flat 116 to that part of the stepped collar 107 that projects inwardly past the stepped collar 108 of the hundreds indicator wheel 102. Similarly, a ratchet wheel 117 having an integral detent wheel 118 associated with it are keyed by means of a flat 119 to the inwardly projecting end of stepped collar 108 to which the hundreds indicator wheel 102 is fastened. It may be seen therefore, that the turning of the digits indicator wheel 104 turns the combined detent and ratchet wheels 112–113, the turning of the tens indicator wheel 103 turns the combined ratchet and detent wheels 114–115, and the turning of the hundreds indicator wheel 102 turns the combined ratchet and detent wheels 117–118.

Each ratchet wheel has ten teeth on it, only one of which is indicated at 120. Additionally, each detent wheel has ten notches 121 in it. However, it is an essential characteristic of this counter that one of the ten notches of each detent wheel, such as the one designated 122, is deeper than the others on the wheel.

The shaft assembly 100 also provides a journal for a pawl carriage 123. This carriage is generally U-shaped comprising one arm 124 shown at the right in FIGURE 10 and a second arm 125 shown at the left in FIGURE 10, which arms reside just inside of the side walls 94—94 of the frame. The two arms 124–125 are joined by a yoke 126, the arms and the yoke being integral. The arm 124 of the pawl carriage shown at the right in FIGURE 10 is entirely within the cover 96 of the counter. The arm 125 at the opposite side has an extension thereon constituting a counter lever 127. A shaft 128 having its ends journalled in the two arms 124–125 such that it parallels the shaft assembly 100 pivotally mounts a pawl assembly 129. A wire spring 130 is wrapped around shaft 128 and it has one end as at 131 resting against the yoke 126 and the opposite end as at 132 resting against the pawl assembly. As best may be seen in FIGURE 10, the pawl assembly has four steps at its outer end. One step constitutes a digits pawl finger 133 that is adapted to engage the digits ratchet wheel 112. Adjacent to this finger, a step at a slightly higher elevation, constitutes a tens pawl finger 134 cooperable with the tens ratchet wheel 114. A step at a slightly higher elevation constitutes a hundreds pawl finger 135 cooperable with the hundreds ratchet wheel 117. The fourth step shown again at a higher elevation merely provides clearance for a spacer washer 136. When the counter lever 127 is in its uppermost position, a cam 137 formed as a part of the pawl carriage is in contact with a cross pin 138, the pin having its opposite ends affixed within the side walls 94—94 of the frame. This contact serves to elevate the pawl fingers 133, 134 and 135. However, when the counter lever 127 is depressed, the cam 137 swings away from cross pin 138 and the fingers 133, 134 and 135 may move down toward the ratchet wheels beneath them under the action of the wire spring 130.

Figure 11:
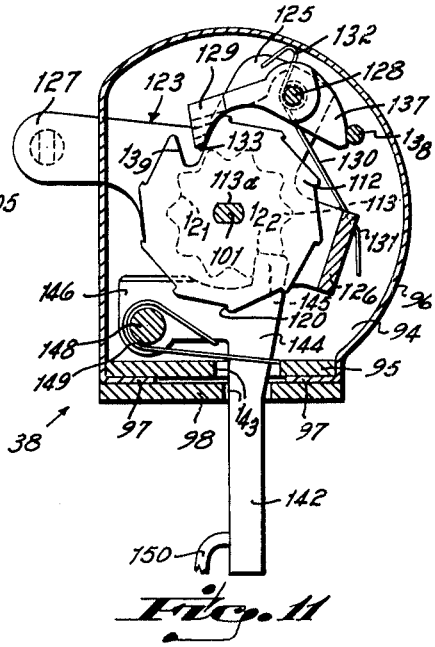
FIGURE 11 is a fragmentary cross sectional view taken on the line 11—11 of FIGURE 9 and showing the counter parts at a zero setting.

At this point, it is to be noted that each one of the three ratchet wheels 112, 114 and 117 has one deep notch 139 in it. When all three of these notches are aligned, going across the assembly as shown in FIGURE 11, all three of the indicator wheels 102, 103 and 104 are at zero. Also under these circumstances, all three of the deep notches 122 in the detent wheels are aligned going across the assembly. For convenience in the construction of the assembly, the deep notches 139 in the ratchet wheels are diametrically opposed to the deep notches 122 in the detent wheels. This relation is shown in FIGURE 11.

The counter of this invention is designed to operate a switch to energize solenoid 77 to decommission the clutch 42, as has been explained, when a zero setting of the indicator wheels is reached, this being after a count-down going backwards from a number initially set on the counter corresponding to the number of tags in a run.

Figure 12:
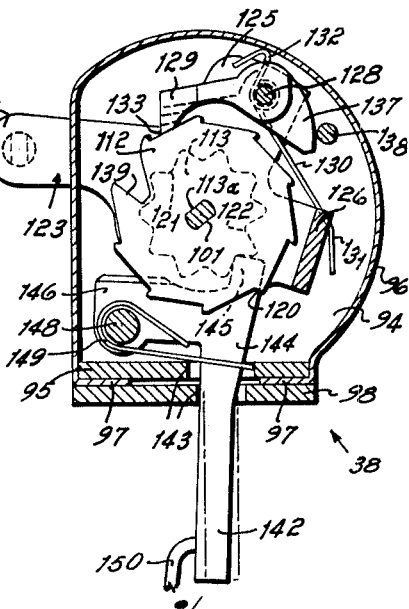
FIGURE 12 is a view similar to FIGURE 11 illustrating the counter set at 999.

The switch is under the control of three fingers designated 140, 141 and 142. These fingers depend from the underside of the counter passing through aligned apertures 143—143 in the bottom wall 95 of the frame and the base plate 98 respectively. As seen in FIGURE 11, each finger is part of a click or detent 144 that is generally in the shape of the number seven as viewed from the side. A protuberance 145 extends upwardly where the horizontal arm designated 146 meets the vertical arm or finger part of the seven-shaped detent. All three of the finger-detents 140, 141 and 142 are pivotally mounted on a shaft 148 that extends across the lower portion of the counter, paralleling the axis of the shaft assembly, at the side of the counter from which the counter lever 127 projects. Wire springs 149 are employed to urge the detent-fingers upwardly such as to bring the protuberances 145 into the notches of the detent wheels. As shown in FIGURE 11, the counter is at a zero setting and the protuberances 145 are engaged in the deep notches 122 of the detent wheels. Thus, the lower ends of the three fingers 140, 141 and 142 are swung toward the right as viewed in FIGURE 11, which is toward the front of the machine. This condition can occur only when all three of the indicator wheels 102, 103 and 104 are set at zero. Any other setting brings at least one of the shallow notches in at least one of the detent wheels into contact with a protuberance 145 and the finger associated therewith is relatively toward the left. This condition is shown in FIGURE 12 and it brings that finger to the left into contact with a switch actuator 150. The movement of the finger from one position to the other is slight, but only a slight movement is required because the switch actuator has a sensitive microswitch associated with it, as will be explained.

Therefore, the operation of the counter is one in which the indicator wheels are turned by hand to set a desired number on them as determined by the number of tags to be run. Taking a run of eleven tags for example, the tens indicator is set at "one" and the digits indicator is set at "one." Under these conditions, the first downward movement of counter lever 127 causes the digits pawl finger 133, the lowermost of the three pawl fingers, to come into contact with the digits ratchet wheel 112. Since the tens pawl finger 134 is elevated with respect to the digits pawl finger 132 no contact is made between the tens pawl finger 134 and the tens ratchet wheel 114 during the first cycle. However, since there is contact between the digits pawl and the digits ratchet wheel, this wheel and only this one is indexed one-tenth of a revolution so that the numeral "ten" shows on the two indicator wheels 103–104. Now, during the next cycle the deep notch 139 on the digits ratchet wheel 112 is in alignment with the digits pawl finger 133 so that the whole pawl carriage can drop down bringing the tens pawl finger 134 into contact with the tens ratchet wheel 114. Under these circumstances, both the tens and the digits ratchet wheels are rotated together one-tenth of a revolution. This moves the tens indicator wheel 103 from "one" to "zero" and it moves the digits indicator wheel from "zero" to "nine." Thereafter, with the setting at "zero" on the tens indicator wheel and a setting of "zero" on the hundreds indicator wheel (since it was not moved initially from its zero setting) only the digits indicator wheel 104 can be indexed and it is indexed from "nine" going backwards to "zero" at which time not only are all of the deep notches 139 in the ratchet wheels aligned but all of the deep notches 122 in the index wheels are aligned, so that now all three fingers 140, 141 and 142 are to the right as shown in FIGURE 11 which permits the switch actuator 150 to move toward the right. This operates the switch to decommission the clutch 42 by energizing the solenoid. As stated previously, the only time the switch can be operated is when all three fingers are in alignment toward the right as shown, this direction being toward the front of the machine in the embodiment illustrated.

Another example of a count-down is illustrated in FIGURES 12 through 15. In FIGURE 12, the counter is set at "nine hundred ninety-nine." The deep notches 139 in the ratchet wheels are aligned, but they are one position removed counterclockwise from that shown in FIGURE 11. On the first down-stroke of the counter lever 127, only the digits ratchet wheel 112 can be contacted by a pawl finger and this moves the digits ratchet wheel one-tenth of a revolution. This condition is shown in FIGURE 13. The count-down progresses until, as shown in FIGURE 14, deep notch 139 in the digits ratchet wheel is underneath the digits pawl finger 133 at which time the tens pawl finger 134 can make contact with the tens ratchet wheel 114. Under these circumstances, both the digits ratchet wheel and the tens ratchet wheel are rotated one-tenth of a revolution.

The count-down then proceeds to a point at which the deep notch on the tens ratchet wheel is underneath the tens pawl finger 134 so that now the hundreds pawl finger 135 can make contact with the hundreds ratchet wheel 117. This condition is illustrated in FIGURE 15. And so the count-down progresses with one finger of the three, either 140, 141 or 142 being to the left until all three of the deep notches 122 in the ratchet wheels are aligned going across the counter, which results in the switch being actuated to decommission the machine.

*Count selector*

The count selector which is indicated generally by the numeral 29 is mounted on the back of the control panel 30 and it is operated or "set" by means of the two knobs designated 36 and 37. A cast frame 151 is provided for the count selector and it is fastened to the back of the control panel by a plurality of flat headed bolts 152 that pass through the control panel in back of an indicator plate 153 which is, in turn, secured to the face of the control panel by bolts 154. Two shafts project from the count selector through the control panel to receive the knobs 36 and 37. The knob 36 is on the forward end of a block out shaft 155, a flat 156 being provided on the shaft to properly orient knob 36. The other shaft is a reset shaft 157 also having a flat 158 thereon to properly orient the reset knob. As shown in FIGURES 19 and 20, the frame 151 is of cast construction and it is generally in the shape of an L including a plate-like upright wall 159 and a leg 160 which projects rearwardly from the bottom of wall 159. There is also a rear wall 161 paralleling wall 159 that is secured to the rear end of leg 160 by bolts 162—162. Both the block out shaft 155 and the reset shaft 157 are rotatably journalled in the two walls 159 and 161. A boss 163 cast as an integral part of frame 151 extends rearwardly from wall 159 for added support to the reset shaft 157. In addition, there is a cast boss 164 extending across the back of wall 159 above the boss 163 toward the block out shaft 155. Opposite this boss, the block out shaft has five flats upon it (to be identified later), corresponding to the five positions of knob 36 and these flats are adapted to be contacted by a block 165 that is slidably received in a bore 166 within the boss 164. Block 165 has a guide pin 167 projecting from the side thereof opposite the flats on block out shaft 155 that passes through an opening in the block 164. A coil spring 168 surrounds the pin 167 within the bore 166 and serves to urge the block 165 against the flats on the block out shaft 155. The relative position of these flats will be explained later. The reset shaft 157 mounts a number of elements, the locations of which may best be seen in FIGURES 17 and 18.

A drive yoke 169 is one of a number of elements on shaft 157. The right end of the drive yoke is off-set as shown in FIGURE 18 and the pin 28 to which the upper end of the drive link 19 is attached projects at a right angle, rearwardly, from this off-set portion of the yoke. The drive yoke in addition includes a side arm 170 at the rear, a side arm 171 at the front and a connecting arm 172 that is at the left as shown in FIGURES 17 and 18, however, this arm is toward the right when viewing the count selector from the front of the machine. The front and rear arms 170–171 of the drive yoke reside just inside of the rear end of boss 163 and the rear wall 161 of the frame 151 respectively. The reset shaft passes through both arms 170 and 171 and pivotally journals the drive yoke for rocking movement. A snap ring 173 at the rear locks the reset shaft 157 in place. The other elements on the reset shaft going from front to back comprise one arm 174 of a counter yoke designated generally by the numeral 175, a drum designated generally 176 that is best seen in FIGURE 26, and a second arm 177 of the counter yoke 175. Underneath the block out shaft a striker bar 178 joins the arm 177 of the yoke to the arm 174. This striker bar preferably is formed as an integral continuation of arm 177 and is riveted to arm 174 as shown at 179.

In the following description of the details and in the description of the operation, the prefix F is to be used in conjunction with the numbers 1, 2, 3 and 4 to designate four different fingers. The prefix letter S is to be used in conjunction with these same numbers to indicate four different slots. Also the prefix letter D is to be used with these same numbers to indicate detent flats.

Both of the front and rear walls 170–171 of the drive yoke have raised portions 180—180 on them and a shaft 181 has its ends journalled in these raised portions. Split washers 182—182 hold the shaft 181 in place. There are four identical arcuate fingers designated, going from front to back, F–1, F–3, F–4 and F–2 journalled on the shaft 181 for rocking motion. The outer, lower end of each one of these fingers is cut off at a right angle as shown at 183. The opposite end of each arm comprises a radial projection 184 the outer end of which receives a coil spring 185. The opposite end of each coil spring is attached to a bracket 186 secured to the connecting arm 172 of the drive yoke 169. The underside of each projection 184 extends downwardly in an arc to provide a cam surface 187, the function of which will be explained. To the rear of the four fingers F–1 through F–4 the shaft 181 mounts a drive pawl 188. As viewed in FIGURE 17, the pawl is urged in a clockwise direction by means of a coil spring 189 having one end attached to the pawl and having the opposite end attached to the bracket 186. As shown, the four fingers F–1 through F–4 and the pawl are appropriately spaced by means of washers mounted on the shaft 181. It may be seen therefore that when drive link 19 moves downwardly, the drive yoke is caused to rock about the reset shaft in a clockwise direction as viewed in FIGURE 17 which carries the drive pawl 188 and the four fingers F–1 through F–4 with it in a clockwise direction.

The drum 176 constitutes a combination of six operating elements and as shown, they are molded as a unit, preferably of a plastic material. At the rear, shown at the left in FIGURE 26, the drum comprises a clicker wheel 190, which clicker wheel is immediately in front of the arm 177 of a counter yoke 175. The clicker wheel has twelve evenly spaced, identical, V-shaped notches 191 in its periphery. The drum next has a ratchet 192 on it which has twelve equally spaced ratchet steps 193 on its periphery. The next section of the drum has six arcuate indentations 194 that are equally spaced around its periphery. This section is shown in FIGURE 27. The next section has three such arcuate indentations 195 equally spaced about its periphery. See FIGURE 28. The next section has four equally spaced arcuate indentations 196 about its periphery. See FIGURE 29. The forwardmost section of the drum indicated at 197 is cylindrical, its radius being equal to a radius from the center of the drum to the innermost part of any one of the indentations in the drum. The rear portion of the drum is configurated to provide a key 198 by means of which the drum may be locked to appropriate flats on the reset shaft 157.

At this time it will be noted that the cylindrical section shown in FIGURE 30 is cooperable with the finger designated F–1 during a counting operation in which single part tags are being run. The section shown in FIGURE 29 is cooperable with the finger designated F–3 when three part tags are being run. The section shown in FIGURE 28 is cooperable with the finger F–4 when four part tags are being run, and the section shown in FIGURE 27 is cooperable with finger F–2 when two part tags are being run. There are twelve clicker notches 191, six arcuate indentations 194 for a two part tag operation, three arcuate indentations 195 for a four part tag operation, four arcuate indentations 196 for a three part tag operation and no indentations in the cylindrical area 197 for a one part tag operation.

A pivotally mounted clicker arm 199 is urged against the clicker wheel 190 by means of a coil spring 200 to insure proper rotational orientation of the drum such that it moves exactly 30 degrees during each increment of rotational movement. An anti-backup pawl 201 is urged against the ratchet 192 by means of a coil spring 202 to insure that the drum be rotated only in the clockwise direction as viewed in FIGURE 17, this corresponding to a counterclockwise turn of the reset knob 37.

The block-out shaft 155 has four slots extending through it chordally, these sots being designated respectively S–1, S–2, S–3, and S–4 and these slots being located opposite the correspondingly numbered fingers F–1 through F–4. Their relative locations circumferentially of the shaft may best be observed from FIGURES 31–35. The five flats that cooperate with the block 165 to define the five various positions of the block-out shaft 155 are shown in FIGURE 36. Four of these flats going in the counterclockwise position are designated respectively D–1, D–2, D–3, and D–4. These correspond to one through four part tag operation. The fifth flat is designated 203 and it defines an "off" position used in the operation of the machine when the counter is not relied upon but means associated with the feed finger carriage of the machine are relied upon to operate the switch to decommission the machine to be described later. FIGURE 31 shows the relative positions of the slots in the block-out shaft 155 as they appear, as viewed from the top, when the block-out shaft is set for four part tags. The same is true of FIGURES 32 through 36. However, because of the way the sections are taken on FIGURE 31, the top of the shaft is at the left in each of FIGURES 32 through 36.

As shown in FIGURES 17 and 18, the block-out shaft 155 is in its "off" position. In this position none of the fingers F–1 through F–4 are effective and a lock-out arm 204 at the rear of the count selector is cammed downwardly. One end of the lock-out arm is pivotally mounted as at 205 to the rear wall 161 of frame 151. The central area of the lock-out arm has a rectangular opening 206 therein through which a reduced end portion 207 of the block-out shaft projects. Within the opening 206 the end 207 of shaft 155 has a pin projecting radially therefrom. This pin has a rounded outer end constituting a cam surface 208. A collar 209 is pinned to the outer end of the reduced end portion 207 of shaft 155 to confine the lockout arm 204. When the block out shaft 155 is in its "off" position, the cam surface 208 makes contact with the lower edge of the opening 206 and this forces the outer end, which is to the right in FIGURE 17, of the lock-out arm downwardly, holding it there. The outer end portion of the arm 204 extends downwardly, and the very outer end 210 is engaged in a slot 211 in the lower end of a bracket shown fragmentarily only at 212 in FIGURE 17 that is a part of the switch actuator 150 to which reference has been made in the description of the counter. This downward pull does two things. It moves the switch actuator 150 away from the three fingers 140, 141 and 142 associated with the counter, and it preconditions the switch mechanism for operation with shut off mechanism associated with the feed finger carriage, this operation to be described later. But in any event, setting the blockout shaft 155 in the "off" position makes the counter ineffective.

The operation of the count selector will now be described. Assuming that the count selector knob 36 is set at "three" following a setting in which it was at some other number, the reset knob is rotated once in a counterclockwise direction through 360 degrees. As will be seen, this "clears" the drum 176 bringing it to an initial position at which it would be effective for either one, two, three or four part tag operation. With the block-out shaft 155 rotated for three part tag operation, the slot S-3 is opposite the finger F-3 and the bottom of the slot resides on the slant shown in FIGURES 23 and 24. The cam surface 187 on the underside of finger F-3 at this time is resting upon a part of the drum that is 60 degrees away from one of the arcuate indentations 196. During the first cycle of movement, the drive link 19 pulls the drive yoke down. The drive pawl 188 engages one of the teeth 193 of the ratchet and the whole drum is rotated 30 degrees, the clicker insuring that a precise stop is made. During this movement, the cam surface 187 is on a raised area of the drum and as a result, the flat end 183 of the finger F-3 swings down but on an arc of small radius such that it swings to the inside of the striker bar 178 that is part of the counter yoke. During the next cycle, the cam surface 187 remains on the raised part of the drum, but advances 30 degrees toward an indentation 196, and the same thing happens with the flat end 183 missing striker bar 178. During the next cycle, the cam surface 187 drops into an arcuate indentation 196 and under the action of the spring 185 associated with finger F-3, the end 183 is swung out and into a position to make contact with the striker bar 178. This pulls the outer end of the counter yoke 175 downwardly and a connector rod 213 having its lower end attached to a pin 214 on the counter yoke, and its upper end attached to the counter lever 127, causes the counter lever to be swung down counting off one unit on the counter. Thus, even though the count selector 29, under these circumstances, is actuated three times by the drive link 19, only the third actuation of the drive link becomes effective insofar as the counter is concerned.

During the three part operation just described, the other fingers, F-1, F-2 and F-4 are not effective because their associated slots S-1, S-2 and S-4 in the block-out shaft 155 are positioned such that these three other fingers merely hit the sides of the shaft 155 and are cammed inwardly by this contact such that the ends 183 cannot come into contact with the striker bar 178.

Figure 21:
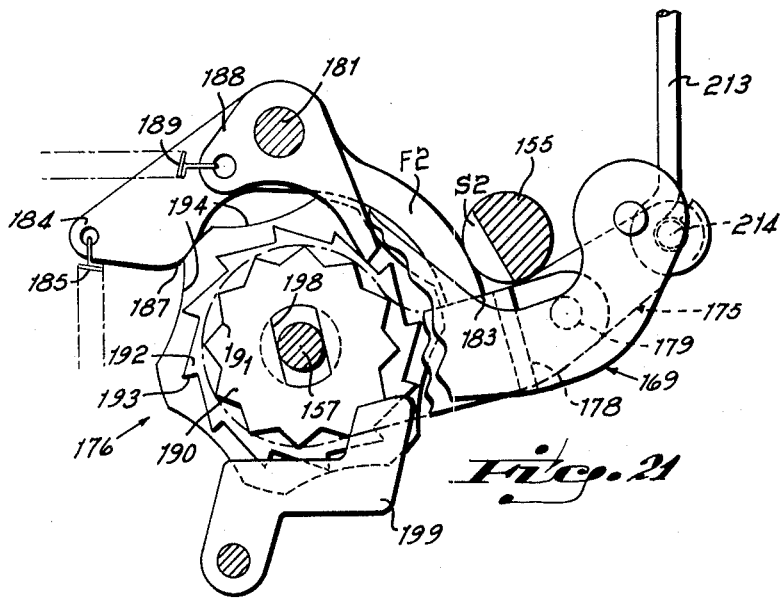
FIGURE 21 is a diagrammatic cross sectional view illustrating the parts of the count selector under circumstances in which it is not effective to transmit a count to the counter.
Figure 22:
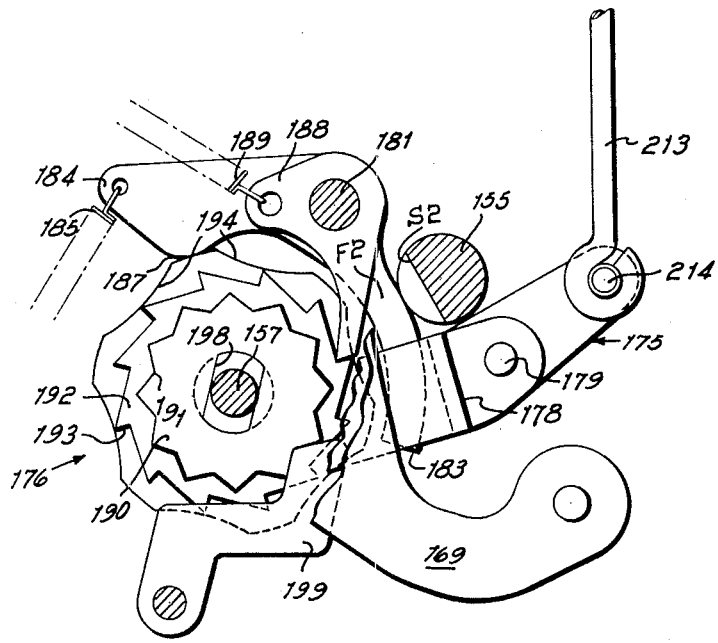
FIGURE 22 is a view similar to FIGURE 21 showing the parts in more advanced positions of movement.

Referring to FIGURES 21 and 22, a situation is shown wherein two part tag operation is illustrated. It may be seen that the cam surface 187 of finger F-2 rests upon a high point between two indentations 194—194. When the drive yoke swings down, the arcuate portion of finger F-2 misses shaft 155 due to the contact between the drum and cam 187. However, when the drive yoke is again raised, the cam 187 comes to rest in a depression 194 and during the next movement, the end 183 swings out and passes down through the slot S-2 into contact with the striker bar 178 to actuate the counter. The latter is shown in FIGURE 24 and it may be seen that the other three fingers in back of finger F-2, all being represented by the dot dash lines F-4, F-3 and F-1 respectively, are cammed inwardly out of a path that would otherwise carry them into contact with the striker bar. Thus, under these circumstances, only finger F-2 is effective.

*Switch*

A right angular mount bracket 215, comprising a base plate 216 and a vertical wall 217, is attached to the back of the control panel by means such as flat headed screws 218—218 that pass through the control panel from the front. The vertical wall 217 angulates downwardly and extends into the machine to the left (as viewed from the front) of the count selector 29. The bracket 212 that is part of the switch actuator is pivotally mounted for limited swinging movement about a pivot 219 being secured thereon by a lock nut 220. This bracket parallels wall 217. However, the switch actuator portion thereof is turned over at a right angle so as to provide a flange 221 at the top thereof, flange 221 being a continuation of the switch actuator portion 150 as best shown in FIGURE 7. The switch actuator portion is turned upwardly from the forward part of flange 221 and then the very upper tip of the switch actuator portion is turned forwardly to present a straight edge to the three counter fingers 140, 141 and 142, the straight edge spanning all three fingers.

The switch itself, identified generally by the numeral 222, is mounted on the upper portion of wall 217 of mount bracket 215 on the side thereof opposite switch actuator 150, this being to the left in viewing the machine from the front. Switch 222 may be a commercial type of micro-switch having a plunger 223 that is spring urged outwardly. As shown, switch 222 is positioned on wall 217 such that plunger 223, when in extended position, is above the upper edge 224 of wall 217. See FIGURE 8. When the plunger 223 is depressed, no current flows through switch 222, the "on" position of plunger 223 being its extended position illustrated in FIGURE 8. As will be explained, it is important that plunger 223 be spring urged toward its on, extended position. A second bracket 225 is mounted on a pivot 226, being held thereon by a lock nut 227. This pivot is at the rear of the wall 217 such that bracket 225 extends generally forwardly. A flange 228 is turned over at a right angle from the forward part of bracket 225 and this flange generally parallels the flange 221 of bracket 212 in spaced relationship. The distance between the flanges 221 and 228 is adapted to be adjusted by a set screw 229 that threads down through flange 228. A lock nut 230 is provided for set screw 229 and when the switch is in its "off" position, the plunger 223 being depressed, the lower end of set screw 229 rests upon flange 221.

The two flanges 221 and 228 are urged toward one another by means of a coil spring 231. This spring is angularly disposed with respect to the two flanges 221 and 228 to which its opposite ends are attached. That is, the forward upper end of spring 231 is attached to the forward part of flange 228, whereas the rear lower end of spring 231 is attached to the flange 221. When the counter is being used during a run, and the "zero" setting is reached, as shown in FIGURE 2, the switch actuator portion 150 of bracket 212 is free to move forwardly, being urged in this direction by the forward and upward force is of coil spring 231 acting upon flange 221. The equal and opposite force of the spring 231 on flange 228, tending to depress this flange, is overcome by the spring pressure acting upon switch plunger 223 and the plunger moves out, pushing upwardly a finger 232, that is turned over at a right angle from bracket 225 and across the upper edge 224 of wall 217, above plunger 223. Under these circumstances, the bracket 225 swings up about pivot 226 and a circuit through switch 222 is closed to solenoid 77 which decomissions the machine as previously explained. On the other hand, when the counter is set such that one or more of the three fingers 140, 141 or 142 is to the rear, the switch actuator portion 150 is pushed back which swings the rear part of bracket 212 slightly downwardly which increases the force of coil spring 231 on flange 228 such that flange 228 is pulled downwardly and this in turn pulls finger 232 down on plunger 223. This is a rather delicate balance for spring 231 adjustable by set screw 229. That is, when switch actuator 150 is pushed back by fingers 140, 141 and 142, the force of spring 231 must overcome the force of the spring tending to extend plunger 223. On the other hand, when switch actuator 150 is permitted to move forwardly by the three fingers 140, 141 and 142 reaching "zero" positions, spring 231 must be relaxed to a point to permit the spring pressure on plunger 223 to extend the plunger to lift finger 232.

*Feed finger carriage cut-off*

During the operation of the machine, the feed finger carriage 50 makes one forward and one backward reciprocating movement each cycle so that feed fingers designated 233—233 move a tag forward a distance equal to the width of one tag part, the part of the tag being fed moving onto platen 13. A third finger, comprising a switch cut-off finger 234 is mounted on the feed finger carriage to move with it. This finger is pivotally attached as at 235 to the upper end of a lever 236 that is, in turn, pivotally attached as at 237 to the right side of the forward portion of the feed finger carriage. The rear end of the finger 234 beyond the pivotal attachment 235 has an upward projection 238 thereon to which is hooked the rear end of a coil spring 239. The forward end of this coil spring is hooked onto a pin 240 projecting from the side of the feed finger carriage. Thus, the normal tendency of the force of coil spring 239 on projection 238 tends to swing the forward end of finger 234 downwardly rocking about the pivotal attachment 235 of finger 234 to lever 236. Coil spring 239 also acts through the pivotal attachment 235 to normally hold the lever 236 in the position shown in FIGURE 7 wherein its upper end is forward and its lower end is to the rear.

When there are tags 16 within hopper 15 the forward motion of the feed finger carriage causes the switch cut-off finger 234 to ride on the uppermost tag therein, going with it as the forwardmost part thereof moves onto platen 13. In this movement, the forward end of finger 234 is held up in the position shown in FIGURE 7. However, after the last tag has been fed from the hopper 15, the forward end of finger 234 no longer has the support of a tag and it swings downwardly under the action of coil spring 239 to come into contact with a stop 241, this stop comprising a notch at the rear of platen 13 in line with the path of movement of finger 234. Under these conditions, the stop is engaged by finger 234 and this occurs during the last part of the forward movement of the feed finger carriage but prior to its reaching its forwardmost point of travel. Therefore, during the last part of travel of the feed finger carriage, the finger 234 although stationary, moves rearwardly relative to the carriage. This relative movement swings the pivotal attachment 235 of finger 234 to the upper part of lever 236 relatively rearwardly and swings the lower end of lever 236 forwardly. The lower end of the lever 236 has a flange 242 turned over at a right angle from it and this flange is threaded to receive a set screw 243 that projects forwardly through the flange, being locked in position by a nut 244. When the lower end of lever 236 swings forwardly, the forward end of set screw 243 comes into contact with an abutment plate 245 that is formed as an integral part of the bracket 225. This contact raises the finger 232 so that plunger 223 is free to raise under the action of the spring within switch 222. This decommissions the machine so that finger 234, acting against stop 241, constitutes a means for automatically decommissioning the machine when the last tag has been fed from the hopper. This type of operation is employed when the tags for a selected run have been precounted prior to being deposited in hopper 15. During such a run, the knob 36 is set at "off" which, as has been previously explained, positions the lock-out arm 204 such that bracket 212 is pulled downwardly, whereby the forward edge of the switch actuator 150 is away from the counter fingers 140, 141 and 142. This places an increased tension on the spring 231 tending to hold finger 232 down on plunger 223, but this force is overcome by the lever 236 acting upon the abutment plate 245 such that the finger 232 is lifted to permit the plunger 223 to come up into its raised position to decommission clutch 42 and stop the machine.

*Operation with counter*

In describing this type of operation for the marking machine of this invention, it will be assumed that two part tags are to be printed. As disclosed in copending patent application Serial No. 296,664, the back wall of the hopper 15 is adjusted (by means of a knob that shows at 246 in FIGURE 1) to accommodate tags of this width. The lever 25 is then depressed and a stack of the two part tags placed in the hopper. A hopper gate shown at 247 in FIGURE 1 is swung open for the insertion of the tags into the hopper and after they have been inserted, it is closed, the gate serving to maintain the tickets in alignment. At this time, the printing characters may be set by means of the adjustment assembly 248 so that the desired characters are in positions to make impressions upon the tags. If tags of a different width were operated upon during the previous run, the reset knob 37 must be rotated through 360 degrees in the counterclockwise direction as shown by the arrow in FIGURE 1. The knob 36 is then set so that the arrow thereon points toward the number 2. The counter may then be set such that the indicator wheels 102, 103 and 104 show a number corresponding to the number of tags to be run opposite the arrow 249, which arrow may be etched into the cover plate 96 for the counter. If not already running, the machine may then be turned on at the master on-off switch 32. The start button may then be depressed. When this is done, the start button reach rod 57 swings the latch arm 65 such that the clutch arm 46 releases the clutch pin to start the shaft 47 rotating.

At this time, the feed finger carriage 50 moves forward, feeding the first half of the top tag in the hopper into position beneath printing head 12. The downward rocking motion of the hopper platen assembly 17, as described in copending application Serial No. 296,664 pulls the drive link 19 downwardly and this in turn pulls the yoke drive 169 downwardly from the position shown in FIGURE 21 to that shown in FIGURE 22. At this time, however, the cam surface 187 on the finger F-2 is riding on a high point on the drum 176 in that section thereof shown in FIGURE 27. Consequently, the finger F-2 is not extended sufficiently far radially outwardly to engage striker bar 178. Thus, no counting motion is transmitted to the counter through connector rod 213.

The feed finger carriage 50 then retracts, the printing head descends to impress the tag part thereunder and drive link 19 raises. During the next cycle of the machine, in which the second half of the uppermost tag in the hopper is fed into printing position, the downward movement of drive link 19 again rotates finger F-2 but in this instance, the cam surface 187 on finger F–2 is in a depression 194 of the drum and the finger is in position to swing downwardly through slot S–2 and engage striker bar 178. This movement is from the position of the finger F–2 shown in FIGURE 23 to that shown in FIGURE 24. The result is that the rod 213 is pulled downwardly carrying the counter lever 127 with it and thereby subtracting one number from the indicator wheels, showing that one complete tag has been printed. At the place (pin 214) where the lower end of the connector rod 213 is attached to the yoke 175, the lower end of a coil spring 250 is also attached. The upper end of this coil spring 250 is attached by means such as a stud 251 to the underside of the top of control panel 30. This spring 250 acts as a return both for the counter lever 127 and the yoke 175.

In the continued operation of the machine, the odd numbered cycles have no effect upon the connector rod 213 but even numbered cycles do, such that every other cycle has an effect upon the count indicator wheels 102, 103 or 104. The count continues going backward towards zero at which time all three of the fingers 140, 141 and 142 are in their forwardmost positions as a result of the protuberances 145 on these fingers coming to rest in deep notches 122 in the detents 113, 115 and 118. This permits the switch actuator 150 on bracket 212 to move forwardly under the action of coil spring 231. This relaxes the tension of the coil spring 231 on the flange 228 of bracket 225, permitting the spring within the micro-switch 222 to extend the plunger 223. This closes a circuit to a relay of known design that momentarily energizes the solenoid 77 thereby pulling the link 91 toward the rear, resulting in latch plate 82 releasing the latch arm 65 such that coil spring 79 may take over to swing clutch arm 46 into a position that intercepts the clutch pin 45 and thereby disconnects or decommissions the clutch 42 stopping feed finger carriage and the hopper platen assembly in their "home" positions.

Obviously the cycling of the machine may be stopped at any time during the count-down by depressing stop button 35. The count-down may subsequently be restarted by simply pressing start button 34 and the counter will continue to the zero setting of the counter indicator wheels.

Pre-counted run operation

When it is desired to precount the tags in a series of runs, and this is often done when the runs are short, the switch cut-off finger 34 may be relied upon to stop the machine. For such a run the knob 36 is set at "off." As shown in FIGURE 17, the cam surface 208 on the pin on the inner end of the block out shaft 155 forces the lock out arm 204 to swing downwardly pulling the bracket 212 with it. This pulls the switch actuator 150 away from the three counter fingers 140, 141, 142 so that the counter, regardless of the setting thereon, is ineffective. When the machine is started, the cycles continue until the last part of the uppermost tag in hopper 15 is fed onto platen 13. When this occurs, the switch cut-off finger 234, lacking the support of a tag, is free to drop into the notch defining stop 241. This causes the set screw on the lower end of lever 236 to swing forwardly into engagement with the abutment plate 245 on bracket 225 freeing plunger 223 so that a momentary current may be sent to solenoid 77 to decommission the clutch 42 just as in an automatic counting operation in which the counter is relied upon.

Thus, this invention provides two automatic controls for a marking machine adapted to operate upon ready-to-wear, multi-part tags, automatic operation under control of the counter stopping the machine after a prescribed number of complete tags has been printed and fed from the machine, and automatic operation under the control of switch cut-off finger 234 stopping the machine after a precounted run of tags in the hopper have been exhausted. It also provides a manual stop that is so arranged that may be used to override either of the automatic operations.

Having described my invention, I claim:

In a marking machine adapted to print indicia on each part of a run of multi-part tags, said machine having reciprocatable means therein adapted to operate once during each cycle of the machine that results in the printing of one part of a multi-part tag, means to count complete tags comprising a subtracting counter adapted to count backwards from a preselected setting corresponding to the number of complete tags desired in a run to a "zero" setting, means adapted to stop said machine upon the counter reaching said "zero" setting, a count selector, means connecting said count selector to said reciprocatable means whereby said count selector is actuated once during each cycle of the machine, means connecting said count selector to said counter for actuation of said counter, manually settable means associated with said count selector to condition said count selector to transfer the movement of said reciprocatable means to said counter only once for a number of movements of said reciprocatable means corresponding to the number of parts of each multi-part tag of the tags being run, said manually settable means includes a shaft having chordal notches therein, a plurality of fingers simultaneously adapted to rock in arcuate paths that parallel one another, said shaft disposed to intercept said paths, and said notches offset both circumferentially and longitudinally of said shaft such that rotation thereof selectively presents one notch at a time to one path of one finger at a time, whereby only one finger may pass through a notch for a rotational setting of said shaft, and means contactable by a finger passing through a notch to actuate said means connecting said count selector to said counter.

References Cited by the Examiner
UNITED STATES PATENTS

| | | | |
|---|---|---|---|
| 1,889,250 | 11/1932 | Kohnle | 93—88 |
| 1,969,898 | 8/1934 | Mortimer | 93—88 |
| 1,988,365 | 1/1935 | Thackery | 235—132 |
| 2,170,406 | 8/1939 | Hamann | 235—91 X |
| 2,372,460 | 3/1945 | Turner | 235—132 |
| 2,538,988 | 1/1951 | Toby | 235—132 |
| 2,622,804 | 12/1952 | Hamisch | 235—132 |
| 2,708,873 | 5/1955 | Braun | 235—132 X |
| 2,754,751 | 7/1956 | Marsh | 101—19 |
| 2,762,567 | 9/1956 | Van Veen | 235—132 |
| 2,890,650 | 6/1959 | Bone | 235—132 X |

LEO SMILOW, *Primary Examiner.*